US011415457B2

(12) United States Patent
Lai et al.

(10) Patent No.: US 11,415,457 B2
(45) Date of Patent: Aug. 16, 2022

(54) VIBRATION SENSOR WITH SLIDING MAGNET

(71) Applicant: NATIONAL APPLIED RESEARCH LABORATORIES, Taipei (TW)

(72) Inventors: Yu-Sheng Lai, Hsinchu (TW); Jui-Min Liu, Hsinchu (TW); Hsu-Chun Cheng, Hsinchu (TW); Mei-I Li, Hsinchu (TW); Chun-Chi Chen, Hsinchu (TW); Cheng-San Wu, Hsinchu (TW); Jia-Min Shieh, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 490 days.

(21) Appl. No.: 16/170,471

(22) Filed: Oct. 25, 2018

(65) Prior Publication Data
US 2019/0360859 A1 Nov. 28, 2019

(30) Foreign Application Priority Data
May 23, 2018 (TW) .................................. 107117634

(51) Int. Cl.
*G01H 11/02* (2006.01)
(52) U.S. Cl.
CPC .................................... *G01H 11/02* (2013.01)
(58) Field of Classification Search
CPC ..................................................... G01H 11/02
(Continued)

(56) References Cited

U.S. PATENT DOCUMENTS 3,129,347 A * 4/1964 Tognola .................. G01P 15/11
310/15
5,834,649 A * 11/1998 Narai ...................... B06B 1/045
73/649
(Continued)

FOREIGN PATENT DOCUMENTS

CN 105783883 A 7/2016
CN 107879310 A 4/2018
(Continued)

OTHER PUBLICATIONS

Translation of JP-164929 (Year: 1981).*
Office Action and Search Report for counterpart Chinese Application No. 201910410486.9, dated Feb. 19, 2021.

*Primary Examiner* — Nimeshkumar D Patel
*Assistant Examiner* — Nashmiya S Fayyaz
(74) *Attorney, Agent, or Firm* — Rosenberg, Klein & Lee

(57) ABSTRACT

The present invention provides a vibration sensor, which comprises a circuit board having an accommodating space. A sensing assembly is disposed in the accommodating space. A recess for magnet sliding is disposed in the sensing assembly. Dispose a magnet in the recess and then dispose a coil layer on an arbitrary side or both sides of the sensing assembly. Furthermore, a lubricating layer is coated on the recess. Alternatively, the recess can be a vacuum structure or a hollow cross-sectional structure for reducing the friction between the recess and the magnet. Alternatively, the coil layer can be coated with a protective layer or multiple layers can be stacked. Without increasing the area of the sensor, the sensing on the variation of magnetic flux can be improved. Accordingly, the vibration sensor according to the present invention can achieve wideband detection of vibrations.

10 Claims, 10 Drawing Sheets

(58) Field of Classification Search
USPC .......................................................... 73/654
See application file for complete search history.

(56) References Cited

U.S. PATENT DOCUMENTS

| | | | | |
|---|---|---|---|---|
| 2007/0007827 | A1* | 1/2007 | Harris | H02K 35/04 310/15 |
| 2010/0187835 | A1* | 7/2010 | Hohlfeld | B81B 3/0021 290/1 R |
| 2011/0316558 | A1* | 12/2011 | Pfaffinger | G01D 5/2216 324/603 |
| 2014/0028151 | A1* | 1/2014 | Morita | H02K 35/04 310/310 |

FOREIGN PATENT DOCUMENTS

| | | | | |
|---|---|---|---|---|
| EP | 0662606 | A2 * | 7/1995 | ........... G01C 22/006 |
| JP | 56-164929 | | * 12/1981 | ............. G01H 11/00 |
| JP | H1132471 | A * | 2/1992 | |

* cited by examiner

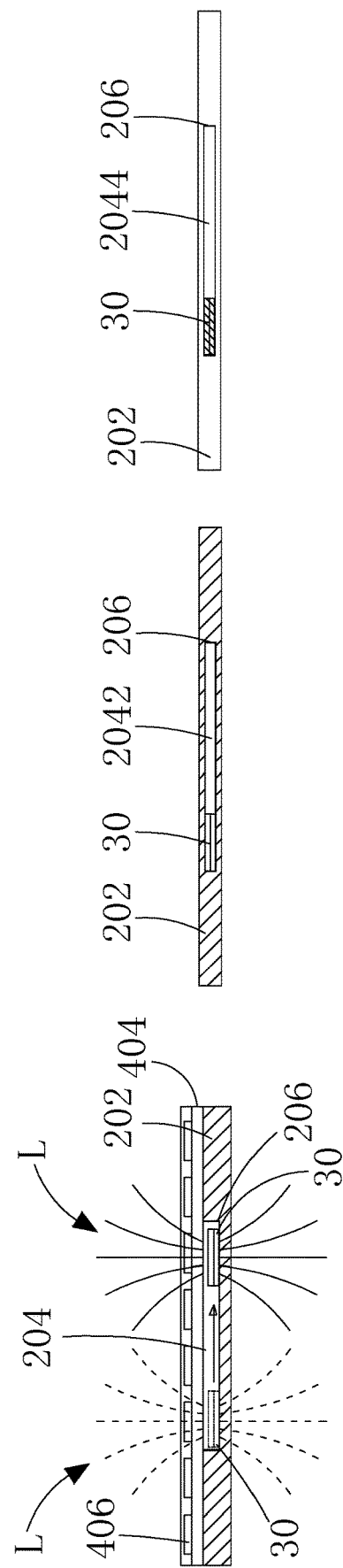

VIBRATION SENSOR WITH SLIDING MAGNET

FIELD OF THE INVENTION

The present invention relates generally to a vibration sensor, and particularly to a vibration sensor that senses vibration by using, instead of a rigid structure, a magnet sliding due to external force and hence changing the magnetic flux through a coil layer.

BACKGROUND OF THE INVENTION

In the highly developed modern industries, the development trend of the testing technology is digitization and informatization. The foremost part of a testing system is the sensor. Sensors are classified worldwide as the cutting-edge technology. In particular, the IC technology and the computer technology developing rapidly in recent years provide excellent and reliable scientific and technological foundation for the prosperous development of sensors. Moreover, the important features of modern sensors include digitization, multi-functions, and intelligence.

Among current general vibration sensors, the most popular ones are the chip vibration sensors including electromagnetic sensing coils and magnets or those sensing by detecting capacitance changes. The general vibration sensors adopted currently sense vibration by detecting capacitance changes. When this type of sensors operate, an additional bias should be supplied. The operation principle is to convert parameters of mechanical vibration into electrical signals, which are then amplified by electrical circuits for displaying and recording. The main point is to convert first the quantities of mechanical vibration into electrical quantities such as electromotive force, charges, and others. Next, the electrical quantities are measured to deduce the mechanical quantities to be measured. This is the most popular measurement method currently.

The above sensing system mainly comprises three key points. First, the quantities of mechanical vibration are converted into mechanical, optical, or electrical signals. The device responsible for this task is called the sensor. Secondly, there are many types of measurement circuits. They are designed according to the principles of energy conversion for various sensors. The third key point is the signal analysis and display, namely, the recording function. According to the measurement requirements, the voltage signal output from the measurement circuits can be fed to a signal analyzer or display instrument. If required, the signal can be recorded in magnetic tapes first before it is fed to a signal analyzer for performing various analyses and processes and giving the final results.

In general, the mechanical energy of vibration can be directly or indirectly converted into the electrical quantities because of different vibration sensing manners, such as piezoelectric sensing, magnetic sensing, resistance sensing, capacitance sensing. Further, the electrical quantities of the sensor is determined by the vibration strength and the conversion performance. Thereby, vibration sensor does not convert the vibration energy into electrical quantities directly as shown in a sensing index or a sensing result thereof. In practice, the original vibration energy is inputted as the input quantities to the vibration energy receiving part of the vibration sensor for forming another mechanical energy suitable for energy conversion. Finally, the mechanoelectrical conversion part of the vibration sensor converts the mechanical energy suitable for energy conversion into electrical quantities. Thereby, the operational properties of a sensor are determined by the vibration energy receiving part and the mechanoelectrical conversion part, as determined by the received vibration strength and the conversion performance.

Because mechanical motions are the simplest form of material movement, the first way people can figure out is to measure vibrations mechanically and thus giving mechanical vibration sensors, for example, the Geiger vibrograph. The sensing of a mechanical sensor is based on the principle. While measuring, the body of a relative-type vibration sensor is fixed to an immobile frame. The vibration direction of the sensing rod coincides with that of the object under test. By using the elastic force exerted by a spring, the sensing rod can contact the surface of the object under test. When the object vibrates, the sensing rod moves along with it and drives the recording stylus to plot the variation curve of the displacement of the vibrating object as a function of time on a moving paper band. According to the recording curve, parameters such as displacement and frequency can be calculated.

According to the principle, there are many similar methods for sensing vibration according to the prior art. Base on the original foundation, the technique of electromagnetic sensing is added. One of an electromagnetic coil and magnet is fixed while the other is fixed to a spring. When vibrations occur, if the amplitude and frequency exceed the Young's modulus of the spring, the fixed electromagnetic coil or the magnet starts to move toward a fixed direction and hence converting the mechanical energy of vibration into the elastic potential energy of the spring. In this process, because the number of the magnetic-field lines of the magnet passing through the magnetic coil changes, an electromotive potential is induced. Accordingly, the vibration of an object under test can be detected.

Unfortunately, the drawback of the above technology according to the prior art is that the spring is a rigid body. The coil layer fixed to the spring or the magnet need to overcome the Young's modulus before the spring can be compressed and deformed. This will limit the detection capability for low-frequency vibrations and the range for wide-frequency vibrations while detecting vibrations, making some sensing, such as 1 Hz vibrations or vibrating bandwidth of MHz, not possible.

In addition, if the sensor is situated in a place without or with strictly limited power supply, the vibration sensors that detect vibrations using a rigid structure and sensing capacitance changes according to the prior art need to apply a bias before measurement, for example, when a battery cannot be installed because the internal space of the sensing system is tight; when a sensor with wireless communication functions is power consuming owing to the massive communication demand; when a wireless sensor is placed outdoors, where power lines cannot reach or batteries are difficult to be replaced; when a sensor is installed inside a human body, where batteries are difficult to be replaced and power lines are impossible to reach; or scenarios when batteries are difficult to be replaced. In some applications, certain microelectromechanical systems (MEMS) sensors require huge energy for enabling their sensing functions. Thereby, no bias is needed while vibration sensing, making their application range broader.

To sum up, in the field of vibration sensing, there are many imperfect structures. Accordingly, the present invention provides a vibration sensor capable of detecting vibrations with frequencies greater than or equal to 1 Hz without applying bias. It is thereby applicable to miniaturized and scaled MEMS.

SUMMARY

An objective of the present invention is to provide a vibration sensor capable of sensing wideband vibrations without applying bias.

Another objective of the present invention is to provide a vibration sensor capable of sensing vibrations with frequencies greater than or equal to 1 Hz.

To achieve the above objectives, the present invention discloses a vibration sensor, which comprises a circuit board, a magnet, and a coil layer. The circuit board includes a recess. The magnet is disposed slidably in the recess. One or more coil layer is disposed on one or more side of the magnet. The coil layer is connected electrically to the circuit board. When the magnet slides in the recess due to external vibrations, the sliding of the magnet changes the magnetic flux passing through the coil layer and thus generating an induced signal, which is further output via an output electrode of the circuit board.

According to an embodiment of the present invention, it is further disclosed that a protective layer including magnetic materials is coated on the surface of the coil layer.

According to an embodiment of the present invention, it is further disclosed that the coil layer includes a substrate and one or more metal coil disposed on the surface of the substrate.

According to an embodiment of the present invention, it is further disclosed that a lubricating layer is coated on the surface of the recess. The lubricating layer includes fluorine, silicon, carbonate, or nanometer particles.

According to an embodiment of the present invention, it is further disclosed that a conductive wire is includes for connecting the metal coil and the output electrode.

The present invention discloses a vibration sensor, which comprises a circuit board, a sensing assembly, a magnet, and a coil layer. The circuit board includes an accommodating space. The sensing assembly is disposed in the accommodating space and includes a sensing substrate. The sensing substrate further includes a recess. Further, the magnet is disposed slidably in the recess. One or more coil layer is disposed on one or more side of the sensing assembly. The coil layer is connected electrically to the circuit board. When the magnet slides in the recess due to external vibrations as the sensing assembly is not biased, the sliding of the magnet changes the magnetic flux through the coil layer and thus generating a sensing signal, which is further output via the output electrode of the circuit board.

According to an embodiment of the present invention, it is further disclosed that the inner side surface of the accommodating space of the circuit board is bonded and fixed to the outer periphery of the sensing assembly; and the coil layer is bonded and fixed to the sensing assembly.

According to an embodiment of the present invention, it is further disclosed that a protective layer including magnetic materials is coated on the surface of the coil layer.

According to an embodiment of the present invention, it is further disclosed that the coil layer includes a substrate and one or more metal coil disposed on the surface of the substrate.

According to an embodiment of the present invention, it is further disclosed that a lubricating layer is coated on the surface of the recess. The lubricating layer includes fluorine, silicon, carbonate, or nanometer particles.

According to an embodiment of the present invention, it is further disclosed that the embodiment further includes a conductive wire for connecting the metal coil and the output electrode.

The present invention discloses a vibration sensor, which comprises a circuit board, a sensing assembly, magnets, and a coil layer. The circuit board includes an accommodating space. The sensing assembly is disposed in the accommodating space and includes a plurality of sensing substrates. The plurality of sensing substrates further include recesses. Furthermore, a recess holds a magnet; the magnet is disposed slidably in the recess. One or more coil layer is disposed on one or more side of the sensing assembly. The coil layer is connected electrically to the circuit board. When the magnet slides in the recess due to external vibrations, the sliding of the magnet changes the magnetic flux passing through the coil layer and thus generating a sensing signal, which is further output via the output electrode of the circuit board.

According to an embodiment of the present invention, it is further disclosed that a protective layer including magnetic materials is coated on the surface of the coil layer.

According to an embodiment of the present invention, it is further disclosed that the coil layer includes a substrate and one or more metal coil disposed on the surface of the substrate.

According to an embodiment of the present invention, it is further disclosed that a lubricating layer is coated on the surface of the recess. The lubricating layer includes fluorine, silicon, carbonate, or nanometer particles.

According to an embodiment of the present invention, it is further disclosed that a the embodiment further includes conductive wire for connecting the metal coil and the output electrode.

BRIEF DESCRIPTION OF THE DRAWINGS

FIG. 4A shows a longitudinal cross-sectional view of the sensing assembly according the first embodiment of the present invention;

FIG. 4B shows a longitudinal cross-sectional view of the sensing assembly according the second embodiment of the present invention;

FIG. 4C shows a longitudinal cross-sectional view of the sensing assembly according the third embodiment of the present invention;

DETAILED DESCRIPTION

In order to make the structure and characteristics as well as the effectiveness of the present invention to be further understood and recognized, the detailed description of the present invention is provided as follows along with embodiments and accompanying figures.

The present invention is involved in the research and development of vibration sensors for improving the problem of requiring a bias while sensing for the sensors according to the prior art. In addition, thanks to the omission of rigid structures in the present invention, the sensing is more sensitive, capable of detecting vibration frequencies as low as 1 Hz and hence achieving wideband detection. This is hard to be achieved in the prior art. Besides, the structure design according to the present invention is reasonable and the size is miniaturized, leading to convenient and broader applications.

Figure 1A:
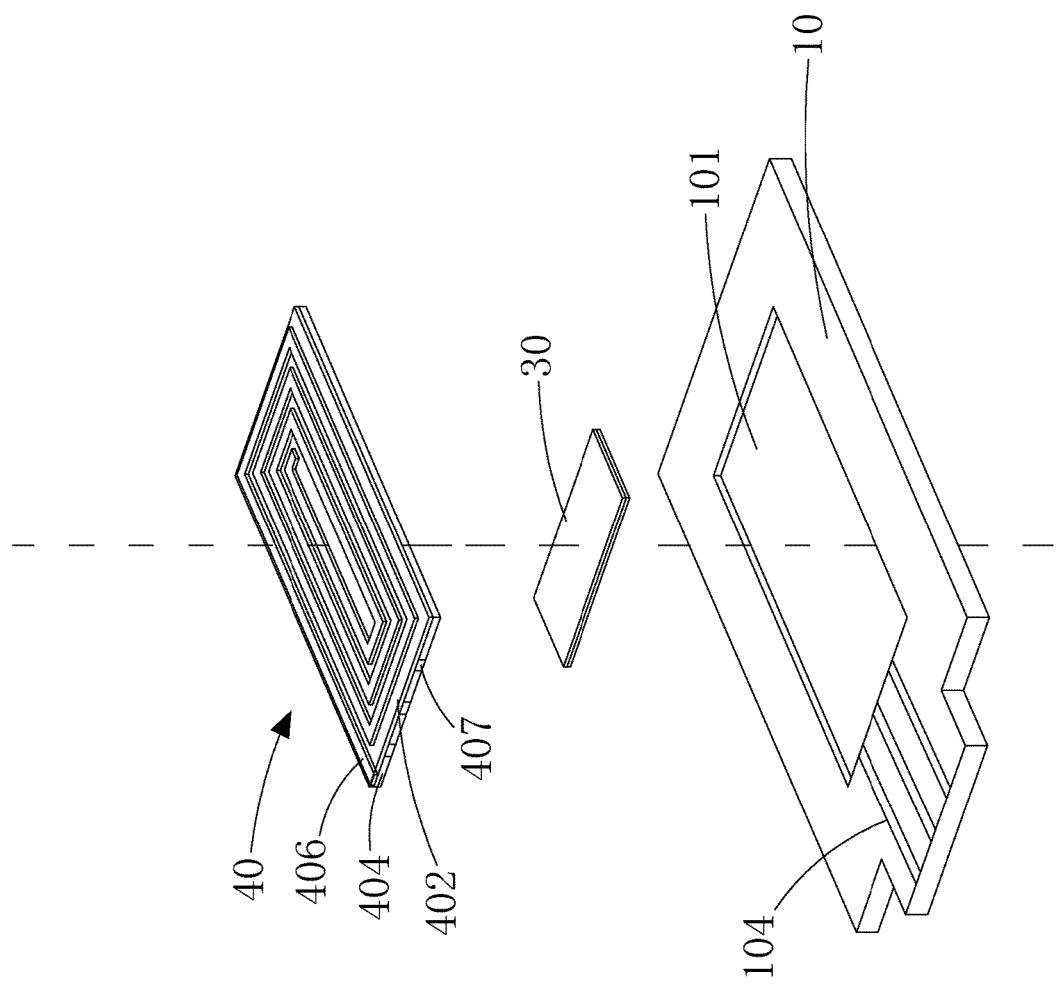
FIG. 1A shows an exploded view of the structure according a preferred embodiment of the present invention.

First, please refer to FIG. 1A, which shows an exploded view of the structure according a preferred embodiment of the present invention. As shown in the figure, the present invention provides a vibration sensor, which comprises a circuit board 10, a magnet 30, and one or more coil layer 40. The circuit board 10 includes a recess 101. The magnet 30 is disposed in the recess 101 and capable of moving along a linear direction. The coil layer 40 is disposed on the recess 101 and spaces the magnet 30 by a gap. The coil layer 40 is connected electrically with an output electrode 104 of the circuit board 10 through a conductive wire 407.

Figure 1B:
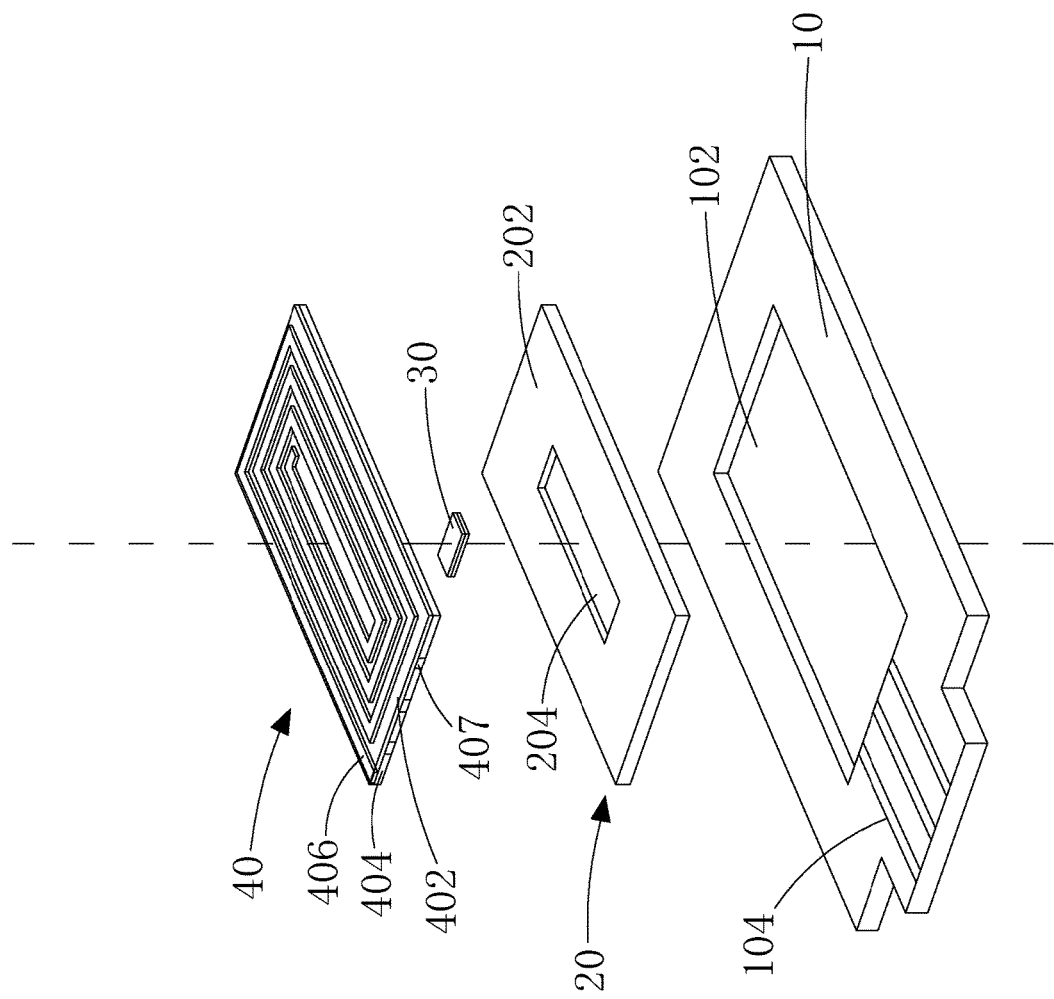
FIG. 1B shows an exploded view of the structure according a preferred embodiment of the present invention.

Please refer to FIG. 1B, which shows an exploded view of the structure according a preferred embodiment of the present invention. As shown in the figure, the present invention provides a vibration sensor, which comprises a circuit board 10, a sensing assembly 20, a magnet 30, and one or more coil layer 40. The circuit board 10 includes an accommodating space 102. The sensing assembly 20 is disposed in the accommodating space 102. The sensing assembly 20 includes a sensing substrate 202. The sensing substrate 202 further includes a recess 204. The magnet 30 is disposed in the recess 204 and capable of moving along a linear direction. The coil layer 40 is disposed on one side of the sensing assembly 20. The coil layer 40 is connected electrically with an output electrode 104 of the circuit board 10 through a conductive wire 407 for forming a circuit.

Figure 2:
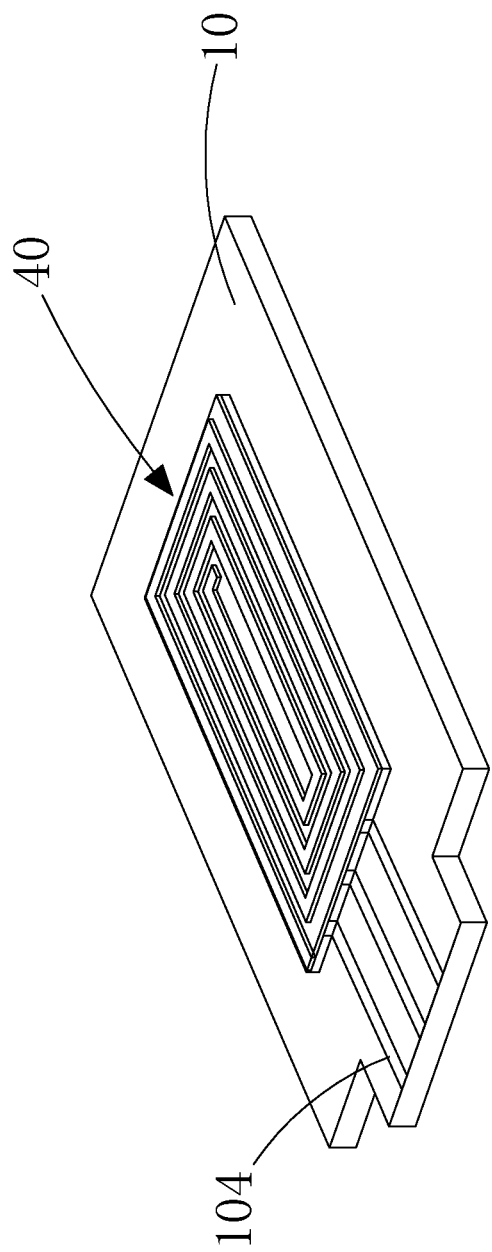
FIG. 2 shows an assembly view of the structure according a preferred embodiment of the present invention.

Please continue to refer to FIG. 1B and FIG. 2, which shows an assembly view of the structure according a preferred embodiment of the present invention. The inner side surface of the accommodating space 102 of the circuit board 10 is bonded and fixed to the outer periphery of the sensing assembly 20; and the coil layer 40 is bonded and fixed to the sensing assembly 20. The above fixing method can be any fixing method including, but not limited to, gluing fixing and buckle fixing. Furthermore, the coil layer 40 according to the present invention includes a substrate 404 and one or more metal coil 406. The metal coil 406 is disposed on the surface of the substrate 404. For example, the coil layer 40 can be printed circuit board. By using the printed-circuit process, the metal coil 406 of the coil layer 40 can be disposed on the substrate 404 easily. In addition, the backend metallization technology for semiconductors can be adopted for disposing the metal coil 406 on the substrate 404.

Figure 3C:
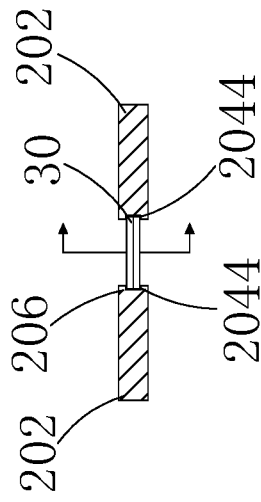
FIG. 3C shows a lateral cross-sectional view of the sensing assembly according the third embodiment of the present invention.
Figure 3B:
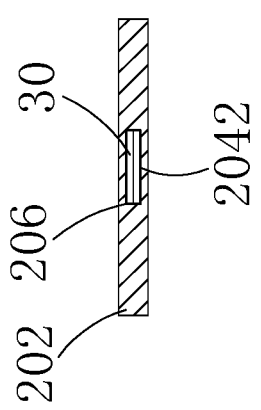
FIG. 3B shows a lateral cross-sectional view of the sensing assembly according the second embodiment of the present invention.
Figure 3A:
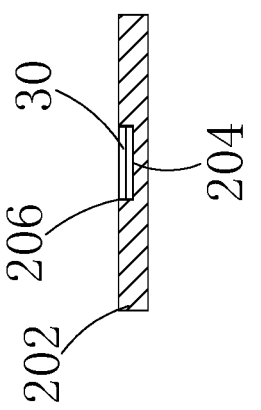
FIG. 3A shows a lateral cross-sectional view of the sensing assembly according the first embodiment of the present invention.
Figure 5:
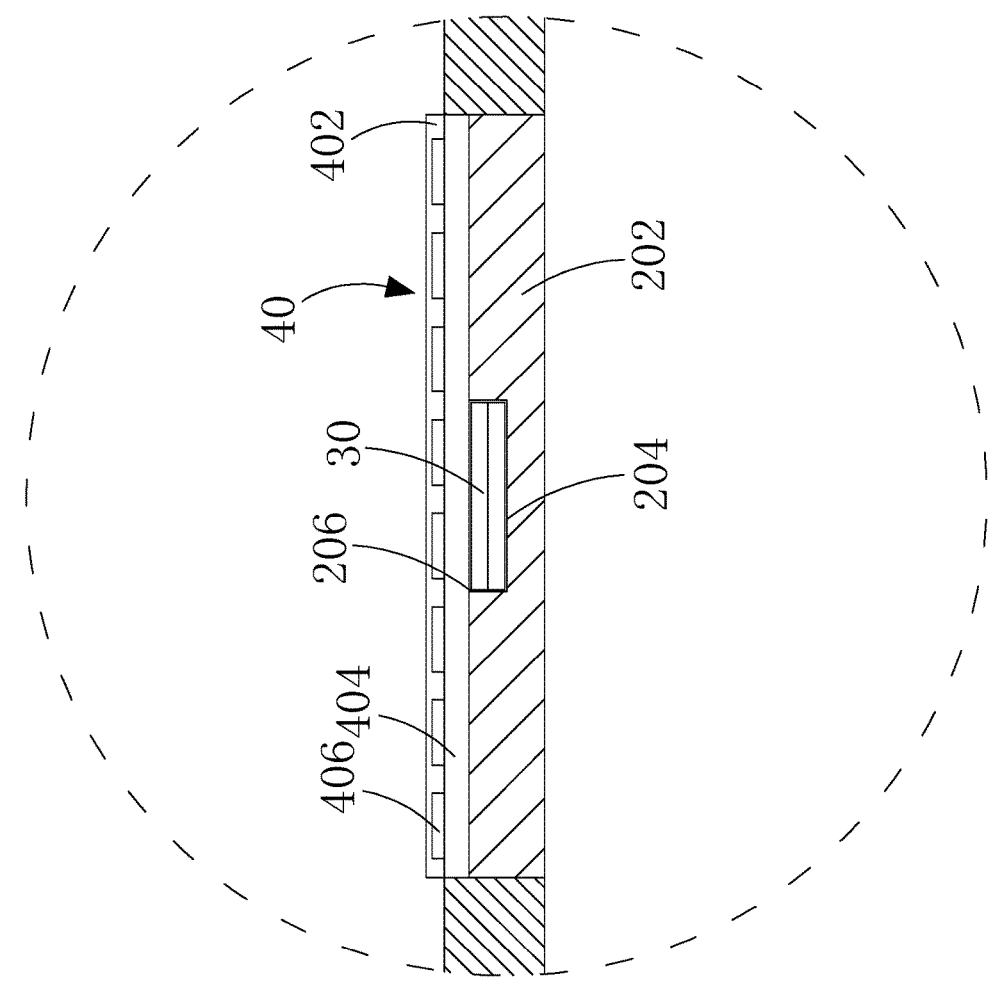
FIG. 5 shows a partially enlarged view according to the first embodiment of the present invention.

Please refer to FIGS. 3A, 4A, and 5, which show a lateral cross-sectional view and a longitudinal cross-sectional view of the sensing assembly and a partially enlarged view, respectively, according the first embodiment of the present invention. As shown in the figures, the first embodiment comprises the circuit board 10, the sensing assembly 20, the magnet 30, and the coil layer 40. The circuit board 10 includes the accommodating space 102. The outer periphery of the sensing assembly 20 is glued and fixed to the inner surface of the accommodating space 102. The recess 204 is disposed on the sensing substrate 202. The magnet 30 is disposed slidably in the recess 204. In addition, to make the magnet 30 move along a linear direction in the recess 204 but not perpendicular to the linear direction, the width or length of the magnet 30 is slightly smaller than the width of the recess 204.

Moreover, the coil layer 40 is disposed on the sensing assembly 20. Because the coil layer 40 needs to sense the magnetic flux variation of the magnet 30, the coil layer 40 covers the recess 204 for facilitating sensing of magnetic flux. The coil layer 40 includes a substrate 404 and a metal coil 406. The metal coil 406 is disposed on the substrate 404. By using the printing process, the metal coil 406 is disposed on the substrate 404. According to the present embodiment, the metal coil 406 is disposed on the substrate 404. In addition, according to another embodiment, the metal coil 406 can be further disposed on the top and bottom sides of the substrate 404 for reinforcing the sensitivity of the coil layer 40.

Please continue to refer to FIGS. 4A, and 5. As shown in the figure, as the magnet 30 and the coil layer 40 have relative displacement, according to the Faraday's Law, it is known that once the magnetic flux in the coil layer 40 varies, an induced signal will be generated. Then the induced signal can be used as the sensing signal generated by the sensing assembly 20 for sensing vibrations. In addition, to make the vibration sensor according to the present invention more sensitive, a protective layer 402 is coated on the surface of the coil layer 40. The protective layer 402 including magnetic materials can cover the coil layer 40 completely for reducing the contact between the coil layer 40 and the air. Hence, the coefficient of magnetic conductance can be increased due to the magnetic materials; the sensing on the variation of magnetic flux can be reinforced; and the sensitivity of the coil layer 40 on the magnetic-field lines of the magnet 30 can be improved. Besides, according to the first embodiment, the distance between the magnet 30 and the coil layer 40 is relatively close, which can facilitate sensing the variation of magnetic flux of the magnet 30 for judging if the magnet 30 moves due to vibrations.

Please continue to refer to FIG. 1 as well as FIG. 4A. In the practical sensing process for vibrations, the magnet 30 moves owing to the external vibrations. The circuit board 10 maintains at the original location due to inertia. The magnet 30 needs to overcome the friction between itself and the inner side of the recess 204. In other words, if the coefficient of friction µ between the magnet 30 and the recess 204 is smaller, it will be easier for the magnet 30 to overcome the friction and start sliding. Because the coil layer 40 is fixed on the sensing assembly 20, the sliding of the magnet 30 in the recess 204 produces relative displacement with respect to the coil layer 40. According to the Faraday's Law, once the magnetic flux through a curved surface surrounded by a closed loop of conductor varies, a current will flow in the close-looped conductor. The magnet 30 slides in the recess 204 as a result of external vibrations. Then the magnetic flux through the coil layer 40 varies and thus generating an induced current. Because the output electrode 104 is disposed on the circuit board 10, by connecting to external electronic equipment and measuring the induced current, the vibration behavior can be deduced. Thereby, the induced current or the induced electromotive force generated by the sensing assembly 20 can be used as the sensing signal. The methods for measuring the induced current or the induced electromotive force are well known to a person having ordinary skill in the art. Hence, the details will not be described again.

Please continue to refer to FIG. 1. As shown in the figure, to make the vibration sensor more sensitive and the range of sensing frequencies broader, the coefficient of friction μ between the magnet 30 and the recess 204 should be reduced. Namely, once the coefficient of friction μ is smaller, the friction for the magnet 30 to overcome will be smaller. Then it will be easier for the magnet 30 to start sliding and producing relative displacement with respect to the coil layer 40. In addition, because the present invention includes no rigid structure as appeared in the prior art, the sensing capability for vibrations can be extended.

Figure 8A:
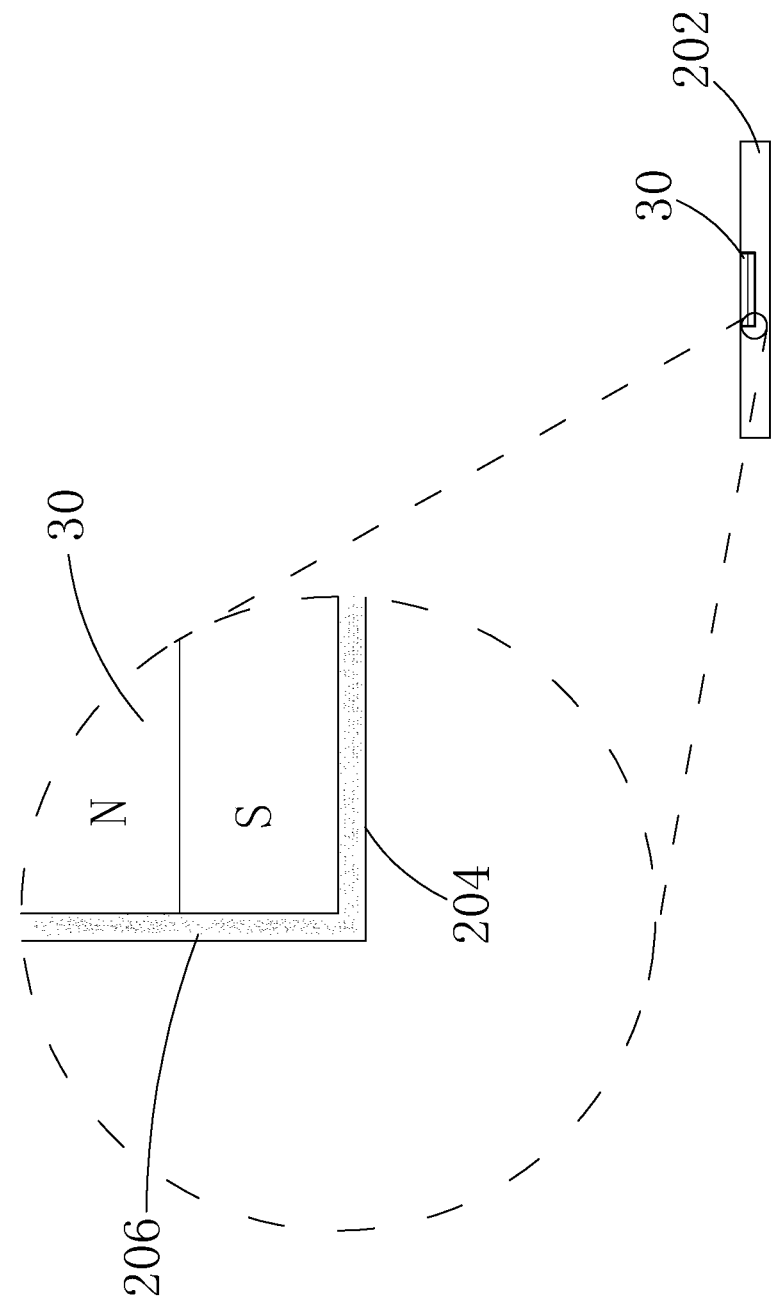
FIG. 8A shows a partially enlarged view according to a preferred embodiment of the present invention.
Figure 8B:
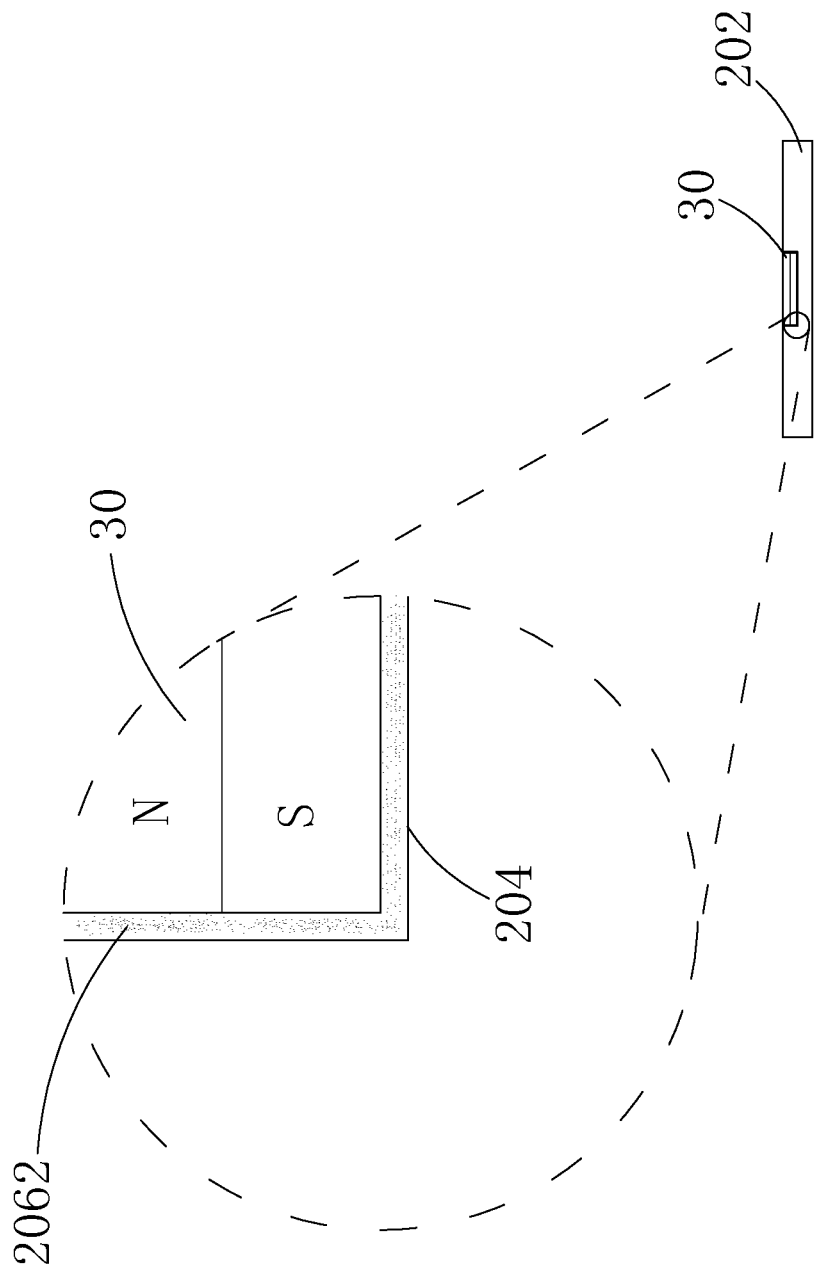
FIG. 8B shows a partially enlarged view according to a preferred embodiment of the present invention.

Please refer to FIG. 8A and FIG. 8B, which show partially enlarged views according to a preferred embodiment of the present invention. As shown in the figures, a lubricating layer 206 is coated inside the recess 204. The coating method can be, but not limited to, spray coating. The main purpose is to reduce the coefficient of friction between the magnet 30 and the recess 204. The lubricating layer 206 include fluorine, silicon, or carbonate. By adding the above materials, the surface of the lubricating layer 206 appears sleeker and thus lowering the coefficient of friction of the magnet 30. Besides, the lubricating layer 206 can be coated using nanometer particles 2062. Because the lubricating layer 206 includes the nanometer particles 2062, the surface of the lubricating layer 206 is a particulate structure, which reduces the contact area between the magnet 30 and the recess 204 and hence the coefficient of friction therebetween. Accordingly, it is easier for the magnet 30 to overcome the friction with the recess 204 and start moving. The structure enables the vibration sensor according to the present invention to sense low-frequency and wideband vibrations such as the low-frequency vibrations with frequencies lower than 1 Hz or the wideband vibrations similar to arm swings.

Figure 6:
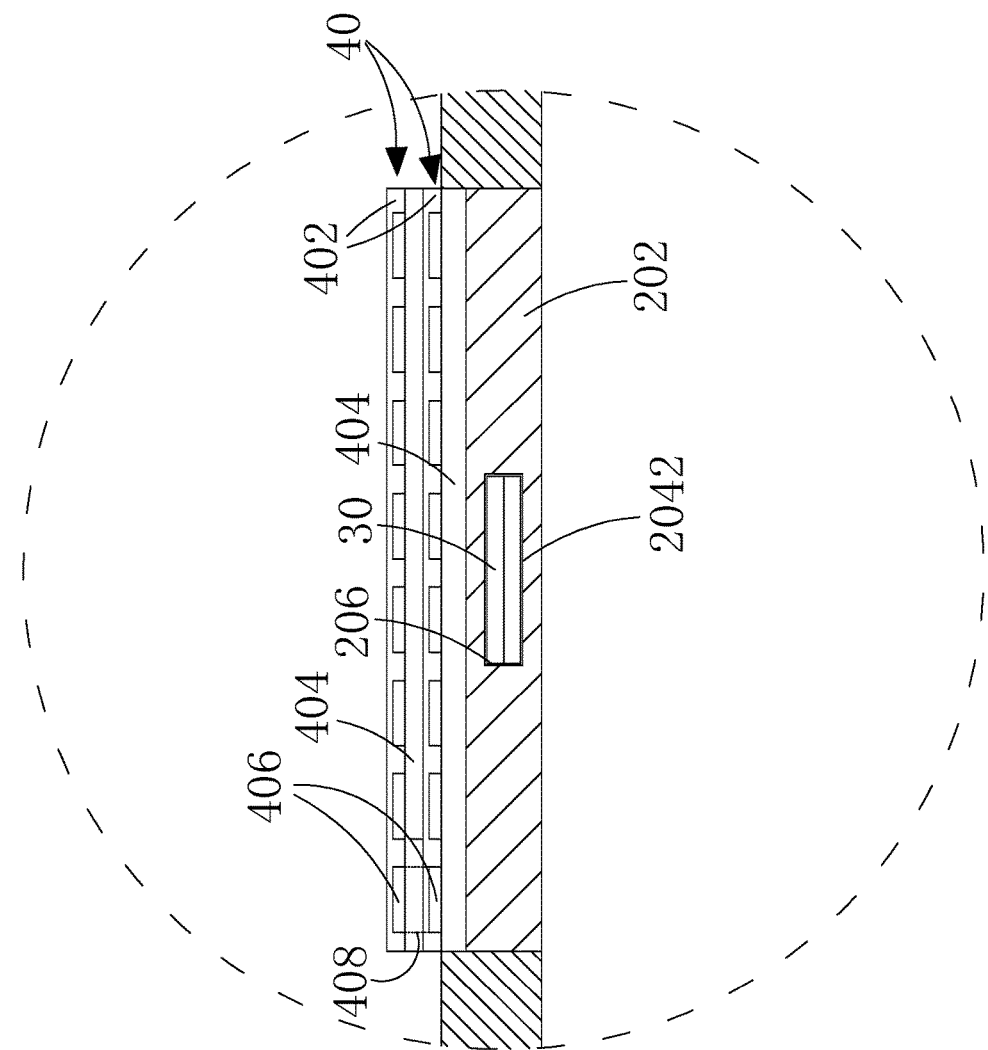
FIG. 6 shows a partially enlarged view according to the second embodiment of the present invention.

Please refer to FIGS. 3B, 4B, and 6, which show a lateral cross-sectional view and a longitudinal cross-sectional view of the sensing assembly and a partially enlarged view, respectively, according the second embodiment of the present invention. As shown in the figures, the structures according to the second and first embodiments are basically the same. The difference is that the sensing substrate 202 according to the second embodiment is not disposed on the top surface of the recess 2042. Instead, the recess 2042 is disposed inside the sensing substrate 202. In addition, the recess 2042 can further be a closed vacuum space. The vacuum structure significantly reduces the obstruction of air resistance on the magnet 30. Then it is even easier for the magnet 30 to overcome the friction and start moving as external vibrations occur. Hence, the vibration sensor according to the present invention can be more sensitive.

In addition, one or more coil layer 40 can be further stacked on the original coil layer 40. The plurality of coil layers 40 are connected in series or in parallel. When the plurality of coil layers are connected electrically in series on the circuit board 10, because the coil turns is proportional to the electromotive force, the plurality of coil layers 40 connected in series raise the induced electromotive force, which is equivalent to increasing the output voltage of the circuit board 10. The plurality of coil layers 40 are connected via a first conductive interconnect layer 408 for connecting electrically the plurality of coil layers 40 on different substrates.

Next, as the plurality of coil layers 40 are connected electrical in parallel with the circuit board 10, because the parallel connection can increase the current, the induced current of the plurality coil layers 40 is increased. The details are depicted in electrical principles and will not be described here. According to the second embodiment, because the air resistance on the magnet 30 is reduced by the vacuum structure of the recess 2042 and the sensing of magnetic flux is improved by stacking the coil layers 40, the vibration sensor according to the present invention becomes more sensitive, facilitating sensing low-frequency and wideband vibrations.

Figure 7:
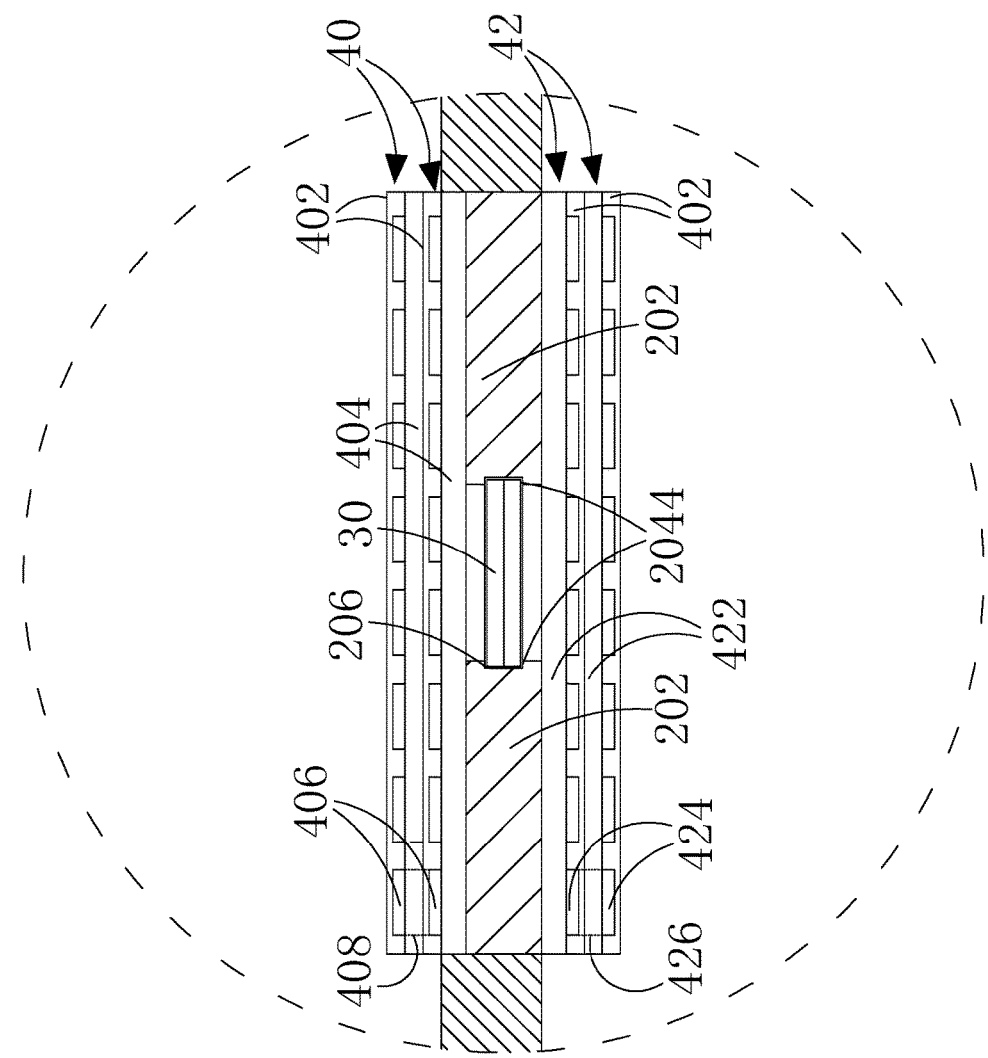
FIG. 7 shows a partially enlarged view according to the third embodiment of the present invention.

Please refer to FIGS. 3C, 4C, and 7, which show a lateral cross-sectional view and a longitudinal cross-sectional view of the sensing assembly and a partially enlarged view, respectively, according the third embodiment of the present invention. As shown in the figures, the structure of the third embodiment and the first embodiment are basically the same. The difference is that according to the third embodiment, one or more second coil layers 42 is disposed on the other side of the sensing assembly 20. The plurality of coil layers 42 are connected electrically to the circuit board 10. Besides, the plurality of second coil layers 42 include a second substrate 422 and one or more second metal coil 424, respectively. The second metal coil 424 is disposed on the surface of the second substrate 422. For example, the second substrate 422 can be a printed circuit board as well. In addition, the plurality of second coil layers 42 are connected electrically via a second conductive interconnect layer 426 for connecting electrically the second coil layers 42 on different substrates.

Besides, the stack number of the second coil layers 42 can vary according to the practical requirements. According to the present embodiment, two layers of the second coil layers 42 are stacked. The plurality of second coil layers 42 and the coil layer 40 are connected in series or in parallel. The outcomes are identical to the effects of increased induced voltage or current as shown in the first embodiment. Hence, the details will not be described again.

Moreover, compared to the previous embodiments, another difference in the third embodiment is that the sensing assembly 20 includes a plurality of sensing substrate 202. A plurality of recesses 2044 are further disposed on the plurality of sensing substrates 202. The plurality of recesses 2044 hold the magnet 30 and the magnet 30 slides in the recesses 2044. According to the present embodiment, because the recesses 2044 hold the magnet 30, a hollow cross-sectional structure is formed. The hollow cross-sectional structure reduces the contact area between the magnet 30 and the recesses 2044 and hence reducing the friction therebetween. Thereby, as external vibrations occur, it is much easier for the magnet 30 to move inside the recesses 2044.

Furthermore, because the recesses 2044 adopts the hollow cross-sectional structure, the hollow parts won't obstruct the magnetic induction generated by the magnet 30 and reduce the intensity of magnetic induction. Compared to the previous embodiments, in the present embodiment, the magnetic induction of the magnet 30 can nearly completely pass through the plurality of coil layers 40 and the plurality of second coil layers 42 and hence reducing the obstruction and loss of the sensing assembly 20 on magnetic induction.

According to the third embodiment, because the recesses 2044 adopt the hollow cross-sectional structure and a plurality of coil layers 40 and a plurality of second coil layers 42 are stacked on both sides of the sensing assembly 20, the induced current or the induced electromotive force generated by the magnetic-field lines of the magnet 30 passing though the plurality of coil layers 40 and the plurality of second coil layers 42. Thereby, the sensitivity of the present vibration sensor can be enhanced, and thus improving the sensing on low-frequency and wideband vibrations.

In addition, although the vibration sensor according to the present invention is quite sensitive in low-frequency and wideband vibrations, this present invention is not limited to detecting low-frequency and wideband vibrations. The present invention can be applied to detecting vibrations of specific frequencies, narrow-frequency vibrations (such as 1 MHz), or higher-frequency vibrations.

To sum up, the vibration sensor according to the present invention is provided for sensing vibrations. The magnet 30 is disposed slidably in the recess 204. The coil layer 40 and the alternatively added second coil layer are disposed on both sides of the sensing assembly 20. Vibrations will lead the displacement of the magnet 30. By sensing the variation of magnetic flux passing through the plurality of coil layers, the induced current or induced electromotive force will be generated. The induced current or induced electromotive force can be used to judge the vibration frequency of the vibration sensor. Furthermore, by coating the lubricating layer 206 on the recess 204 and stacking multiple layers of the coil layers 40 and the second coil layers 42, the vibration sensor according to the present invention can be more sensitive, capable of sensing low-frequency or wideband vibrations. Likewise, high-frequency vibrations can be sensed as well. In addition, the structure design according to the present invention is reasonable, the size is miniaturized, and no bias is required before sensing vibrations, leading to convenient and broader applications.

What is claimed is:

1. A vibration sensor, comprising:
   a circuit board, including a recess and at least one output electrode set thereon;
   a slidable magnet, disposed in said recess, and sliding in said recess; and
   at least one coil layer, disposed on said recess and said slidable magnet, and spaced from said slidable magnet by a gap, and connected electrically with said output electrode of said circuit board via a conductive wire, wherein a protective layer is coated on said coil layer and covers said coil layer completely to reduce said coil layer contacting air and the magnetic conductance of said coil layer increased by said protective layer, and said protective layer includes magnetic materials to further reinforce a magnetic flux on said coil layer;
   wherein said slidable magnet slides in said recess as a result of external vibrations while said slidable magnet in said recess only overcomes the friction between itself and said recess and starts sliding, the sliding of said slidable magnet varies said reinforced magnetic flux of said coil layer and said coil layer generates an induced signal, said coil layer outputs said induced signal to said output electrode of said circuit board by said conductive wire, whereby said varied reinforced magnetic flux of said coil layer responsive to displacement of said slidable magnet to output said induced signal as being indicative of sensed vibration.

2. The vibration sensor of claim 1, wherein said coil layer includes a substrate and one or more metal coil disposed on the surface of said substrate.

3. The vibration sensor of claim 1, wherein a lubricating layer is coated on the surface of said recess and said lubricating layer includes fluorine, silicon, carbonate, or nanometer particles.

4. A vibration sensor, comprising:
   a circuit board, including an accommodating space and at least one output electrode set thereon;
   a sensing assembly, disposed in said accommodating space, consisting of a sensing substrate and a slidable magnet, said sensing substrate including a recess, said slidable magnet disposed in said recess and sliding in said recess; and
   at least one coil layer, disposed on one or more side of said sensing assembly, and connected electrically with said output electrode of said circuit board by a conductive wire, wherein a protective layer is coated on said coil layer and covers said coil layer completely to reduce said coil layer contacting air and the magnetic conductance of said coil layer increased by said protective layer, and said protective layer includes magnetic materials to further reinforce a magnetic flux on said coil layer;
   wherein said slidable magnet slides in said recess as a result of external vibrations while said slidable magnet only overcome the friction between itself and said recess and starts sliding, the sliding of said magnet varies said reinforced magnetic flux of said coil layer and said coil layer generates an induced signal, said coil layer outputs said induced signal to said output electrode of said circuit board by said conductive wire, whereby said varied reinforced magnetic flux of said coil layer responsive to displacement of said slidable magnet to output said induced signal as being indicative of sensed vibration.

5. The vibration sensor of claim 4, wherein the inner side surface of said accommodating space of said circuit board is bonded and fixed to the outer periphery of said sensing assembly and said coil layer is bonded and fixed to said sensing assembly.

6. The vibration sensor of claim 4, wherein said coil layer includes a substrate and one or more metal coil disposed on the surface of said substrate.

7. The vibration sensor of claim 4, wherein a lubricating layer is coated on the surface of said recess and said lubricating layer includes fluorine, silicon, carbonate, or nanometer particles.

8. A vibration sensor, comprising:
   a circuit board, including an accommodating space and at least one output electrode set thereon;
   a sensing assembly, disposed in said accommodating space, consisting of a plurality of sensing substrates and a slidable magnet, said plurality of sensing substrates each including a recess, said slidable magnet disposed in said recess and sliding in said recess and between said substrates; and
   at least one coil layer, disposed on one or more side of said sensing assembly, and connected electrically with said output electrode of said circuit board by a conductive wire, wherein a protective layer is coated on said coil layer and covers said coil layer completely to reduce said coil layer contacting air and increasing the magnetic conductance of said coil layer increased by said protective layer, and said protective layer includes magnetic materials to reinforce a magnetic flux on said coil layer;

wherein said slidable magnet slides in said recess as a result of external vibrations while said slidable magnet overcome the friction between itself and said recess and start sliding, the sliding of said slidable magnet varies said reinforced magnetic flux of said coil layer and said coil layer generates an induced signal, said coil layer outputs said induced signal to said output electrode of said circuit board by said conductive wire, whereby said varied reinforced magnetic flux of said coil layer responsive to displacement of said slidable magnet to output said induced signal as being indicative of sensed vibration.

9. The vibration sensor of claim 8, wherein said coil layer includes a substrate and one or more metal coil disposed on the surface of said substrate.

10. The vibration sensor of claim 8, wherein a lubricating layer is coated on the surface of said recess and said lubricating layer includes fluorine, silicon, carbonate, or nanometer particles.

* * * * *